(12) United States Patent
Pearson (10) Patent No.: US 11,026,395 B2
(45) Date of Patent: Jun. 8, 2021

(54) MILKING APPARATUS

(71) Applicant: Avon Polymer Products Limited, Wiltshire (GB)

(72) Inventor: Christopher Pearson, Melksham (GB)

(73) Assignee: Avon Polymer Products Limited, Wiltshire (GB)

( * ) Notice: Subject to any disclaimer, the term of this patent is extended or adjusted under 35 U.S.C. 154(b) by 138 days.

(21) Appl. No.: 16/391,187

(22) Filed: Apr. 22, 2019

(65) Prior Publication Data
US 2020/0260682 A1    Aug. 20, 2020

(30) Foreign Application Priority Data

Feb. 18, 2019 (GB) ...................................... 1902189

(51) Int. Cl.
*A01J 5/16* (2006.01)
*A01J 5/01* (2006.01)

(52) U.S. Cl.
CPC .. *A01J 5/16* (2013.01); *A01J 5/01* (2013.01)

(58) Field of Classification Search
CPC ...................................... A01J 5/16; A01J 5/01
See application file for complete search history.

(56) References Cited

U.S. PATENT DOCUMENTS

| 3,845,743 | A | * | 11/1974 | Van Staveren | ............ | A01J 5/08 |
| | | | | | | 119/14.31 |
| 4,572,106 | A | * | 2/1986 | Mills | ........................ | A01J 5/08 |
| | | | | | | 119/14.47 |
| 5,069,162 | A | * | 12/1991 | Thompson | ................ | A01J 5/08 |
| | | | | | | 119/14.47 |
| 6,776,120 | B1 | | 8/2004 | Chowdhury | | |
| 6,997,136 | B1 | | 2/2006 | Coates | | |

(Continued)

FOREIGN PATENT DOCUMENTS

| EP | 1647183 A3 | 5/2006 |
| WO | 0145497 A1 | 6/2001 |
| WO | 2007011826 A2 | 1/2007 |

OTHER PUBLICATIONS

International Searching Authority, PCT International Search Report re Corresponding Application No. OCT/EP2020/053451, dated Apr. 23, 2020, 15 pages, Rijswijk.

(Continued)

*Primary Examiner* — Joshua D Huson
*Assistant Examiner* — Caleb Kelsey Hrubes
(74) *Attorney, Agent, or Firm* — McGarry Bair PC (57) ABSTRACT

A milking apparatus is described that includes a longitudinally extending liner made from a resiliently deformable material. The liner is mounted on a rigid support shell. The liner comprises an outer hood configured to lie over an outer surface of the rigid support shell, and an inner barrel configured to be disposed within the rigid support shell and to define an internal volume. The inner barrel extends in the longitudinal direction away from an opening at a first end of the liner, through which opening an animal teat is insertable into the internal volume. The inner barrel is connected to the outer hood at a plurality of longitudinally extending connection regions on an inner surface of the outer hood. These connections define boundary conditions that limit the deformation of the barrel that encloses the teat can be set by the configuration of the liner itself.

14 Claims, 7 Drawing Sheets

(56) References Cited

U.S. PATENT DOCUMENTS

| | | |
|---|---|---|
| 8,001,928 B2 | 8/2011 | Boast |
| 8,991,335 B2 * | 3/2015 | Torgerson ................. A01J 7/04 119/14.47 |
| 2003/0192479 A1 | 10/2003 | Brown |
| 2009/0151641 A1 | 6/2009 | Schulze Wartenhorst et al. |
| 2011/0126768 A1 | 6/2011 | Grace et al. |

OTHER PUBLICATIONS

Intellectual Property Office, Search Report under Section 17 re Corresponding Application No. GB1902189.8, 3 pages, South Wales, NP.

* cited by examiner

MILKING APPARATUS

CROSS REFERENCE TO RELATED APPLICATIONS

This patent application claims the benefit of UK patent application no. 1902189.8 filed on 18 Feb. 2019, which is incorporated by reference herein.

FIELD OF THE INVENTION

The invention relates to a milking apparatus, i.e. an apparatus for removing milk from a teat of an animal, such as a cow, sheep, goat, horse, buffalo, or camel. It also relates to a method of use of such an apparatus.

BACKGROUND

In a conventional milking apparatus, a cylindrical liner of resilient material is housed within a rigid outer body. The liner is typically mounted in a manner that causes it to be under tension along a longitudinal axis of the outer body, e.g. by stretching between attachment points at opposite longitudinal ends thereof. An animal teat is inserted through an opening in the outer body into the cylindrical liner. Suction is applied at the other end of the cylindrical liner to that in which the teat is inserted, to create a partial vacuum within the liner. This partial vacuum draws milk from the teat, but also causes congestion of teat tissues, arising from the accumulation of blood and other fluids. In order to relieve this congestion, a region between the outer body and the liner (typically referred to as the pulsation volume) is periodically switched between atmospheric pressure and a vacuum condition. When the region between the outer body and liner is at a higher pressure than the volume within the liner, the liner collapses around the teat, thereby providing relief from the suction.

EP 1 647 183 A2 describes a milking apparatus in which the liner has membranes that are held under transverse tension i.e. tension in a direction generally perpendicular to the direction of elongation of the barrel of the teat. The membranes are held under this transverse tension in their normal rest state, i.e. even when the milking apparatus is not in operation and no suction or over pressure is being applied. The purpose of the transverse tension is to prevent the membranes contracting too closely around the teat end when the milking apparatus is in operation. Thus, excessively high forces and damage to the teat end can be avoided, while at the same time, maintaining the suction forces experienced by the teat at sufficiently high levels to achieve efficient milking action.

The transverse tension in the liners allows the pressure applied to the barrel of the teat to be maintained at useful levels for milking, while at the same time preventing damage to the teat end when the liner collapses around the teat to relieve congestion within the teat. In effect, the transverse tension of the liners allows the liners to collapse more evenly along the length of the teat during milking than is the case in the conventional milking apparatus described above, and so the milking process partly mimics the sucking action of a calf.

U.S. Pat. No. 6,997,136 discloses a teat cup assembly in which a liner possesses a plurality of longitudinal external ribs, which are received within longitudinal channels on the inner surface of a rigid outer shell. The ribs are loosely retained in the channels to allow the liner to radially articulate as the pressure is switched.

U.S. Pat. No. 8,001,928 discloses a milking apparatus in which the liner is held within a support structure that is housed within the outer body. The support structure provides attachment points between which resilient membranes of the liner extend to define a volume for receiving the teat.

SUMMARY OF THE INVENTION

At its most general, the invention proposes a longitudinal extension to the outer hood of a liner so that boundary conditions limiting the deformation of the barrel that encloses the teat can be set by the configuration of the liner itself. This may be in contrast to known configurations, in which the barrel deformation is influenced by a connection to a separate component, e.g. an outer rigid shell or some other rigid framework. Furthermore, the invention may facilitate improved access to an internal volume defined by the inner barrel, e.g. for sensing, imaging or the like.

According to one aspect of the invention there is provided a milking apparatus (which may also be referred to as a teat cup assembly) comprising: a liner made from a resiliently deformable material, the liner extending along a longitudinal direction; and a rigid support shell, wherein the liner is mounted on the rigid support shell, wherein the liner comprises: an outer hood configured to lie over an outer surface of the rigid support shell; an inner barrel configured to be disposed within the rigid support shell and to define an internal volume of the liner, the inner barrel extending in the longitudinal direction away from an opening at a first end of the liner, through which opening an animal teat is insertable into the internal volume, wherein the outer hood has a longitudinal length commensurate with a longitudinal length of the inner barrel, and wherein the inner barrel is connected to the outer hood at a plurality of longitudinally extending connection regions on an inner surface of the outer hood. The outer hood may thus extend to lie over or cover the whole longitudinal length of the inner barrel, e.g. such that the outer hood and inner barrel define a paid of nested sleeves, capable of being independently pressurised. The rigid support shell may be retained between the nested sleeves. The connection between the inner barrel and the outer hood defines boundary conditions for the deformation of the inner barrel. In use, an animal teat is received in the internal volume, e.g. through the opening. The internal volume may be held at a low pressure, e.g. vacuum, by application of a suction force to the internal volume from an end of the liner opposite the opening. The space between the nested sleeve may be cycled between relative high and low pressure conditions (e.g. atmospheric pressure and vacuum) to cause the inner barrel to repeatedly collapse on to the teat and then move back to its original shape. The boundary conditions affect the manner in which the inner barrel collapses.

The inner barrel may define a teat-receiving volume. The term "commensurate" used above may be understood to mean that the outer hood extends along the inner barrel for at least half the length and preferably the whole length of the teat-receiving volume, i.e. the portion of the inner barrel that is deformable to contact a teat when in use. With this arrangement, the connection between the outer hood and inner barrel is therefore capable of affecting the deformation of the whole operative portion of the inner barrel.

The liner may be a moulded component, e.g. of rubber or the like. The outer hood and inner barrel, as well as any connection between them, may thus be integrally formed, i.e. moulded in one piece. The connection regions may thus be locations at which the inner barrel merges or adjoins the outer hood.

The rigid support shell may be made from any suitable material, e.g. plastic or stainless steel. The rigid support shell may have engagement features arranged to retain the liner. For example, the rigid support shell may retain the liner in a stretched configuration, where there is longitudinal tension in the walls of the inner barrel.

The inner barrel may comprise a plurality of resiliently deformable membranes. In other words, the barrel may comprise a plurality of walls defined by webs of material that extend within the outer hood. Each membrane may be a sheet of resiliently deformable material that extends longitudinally. The inner barrel preferably has a similar cross-section along its length, so the transverse cross-sectional shape of each membrane may be the same along the length of the inner barrel. The membranes may be planar (i.e. a straight line cross-section) or may be curved. The transverse cross-sectional shape of the inner barrel may take any suitable form, although circular or triangular shapes may be preferred.

Each of the plurality of membranes may span between a respective pair of the longitudinally extending connection regions on the inner surface of the outer hood. In one example, where the outer hood is a cylinder, each membrane may have a cross-sectional shape that is a chord of the circle defined by the outer hood. In this arrangement the cross-sectional shape of the inner barrel may be polygonal, e.g. triangular, square or the like.

The membranes may merge or adjoin directly the inner surface of the outer hood. The region in which they merge is the connection region discussed above. Adjacent membranes may share a connection region, i.e. may merge with each other and the outer hood. However, the connection regions at which adjacent membranes merge with the outer hood may be spaced from one another, such that a portion of the inner surface of the outer hood is exposed to the internal volume. This configuration is discussed in more detail below.

In other examples, the longitudinally extending connection regions may comprise one or more longitudinal ribs that protrude laterally inwards from the inner surface of the outer hood. Each membrane may thus extend between a pair of ribs, or between a rib and the inner surface of the outer hood.

With the invention, the configuration of the inner barrel and the setting of boundary conditions along its length is thus facilitated by the extended outer hood. The rigid support shell may be configured to permit connection between the inner barrel and outer hood along the length of the inner barrel. For example, the rigid support shell may include longitudinal slots that align with the connection regions when the liner is mounted on the rigid support shell.

In one example, the rigid support shell may comprise a plurality of fins. Each fin may be disposed in a space between an outer surface of a respective membrane and the inner surface of the outer hood. This space may correspond to the gap between the nested sleeves discussed above. The plurality of longitudinally extending connection regions may extend along a gap (e.g. longitudinal slot) between adjacent fins.

The rigid support shell may comprise a base in which the plurality of fins are retained. The base may be configured to connect to a bottom rim of the outer hood, whereby the fins are wholly enclosed. Enclosing the fins may make the apparatus more robust, as the outer hood provides a resilient protective cover.

The rigid support shell may be modular. For example, the plurality of fins may be detachably mounted in the base. This may allow fins having differing properties to be used with the same base and liner, e.g. to provide the inner barrel with different deformation properties.

The rigid support shell may also affect the deformation of the inner barrel. For example, the outer hood may be stretched over the rigid support shell to impart transverse tension to the inner barrel, e.g. via the connection regions.

The rigid support shell may include a control tube in fluid communication with each space between the outer surface of the membrane and the inner surface of the outer hood. This space may be isolated from the internal volume, and may provide the pulsation chamber for the apparatus. In use, a pressure generating device may be connected to the control tube to cyclically vary the pressure in the pulsation chamber.

The outer hood is preferably cylindrical, as it conventional, but other shapes can also be used. The inner barrel transverse cross-section may be independent of the outer hood shape. For example, the outer hood may have a circular transverse cross-section and the inner barrel may have a non-circular transverse cross-section.

The liner may comprise a vent at the first end thereof, where the vent is configured for the limited admission of ambient air into the internal volume. The inner barrel may be configured to deform in a manner where, in its collapsed state, it defines one or more venting channels that permit airflow along the length of the barrel adjacent the teat from the vent to a second end of the inner barrel opposite the opening. The liner may comprise a milking tube at the second end, e.g. formed as a continuation of the inner barrel.

The connection regions between the inner barrel and the outer hood may advantageously permit the inner barrel to adopt an asymmetric deformation characteristic in its collapsed state. This allows for the provision of one or more venting channels independently of the shape of the inner barrel. For example, a venting channel may be provided with a circular cross-section inner barrel through suitable positioning of the connection regions.

The milking apparatus may further comprises a suction source connected to apply a suction force to the internal volume from a second end of the inner barrel opposite the opening.

As mentioned above, in some examples, the inner surface of the outer hood is exposed to the internal volume. This provides an ability to access the internal volume of the inner barrel without affecting operation of the device in a manner not possible in conventional systems.

To take advantage of this access, the liner may further comprise an auxiliary module mounted on the outer hood, wherein the auxiliary module is configured to access the internal volume through the outer hood.

The auxiliary module may be used for a variety of purposes. In one example, the auxiliary module includes a sensor having a probe that extends through the outer hood into the internal volume. The sensor may be configured to capture information about the internal volume, e.g. by measuring one or more properties of the internal volume. Advantageously, the sensor can capture the information along the whole length of the inner barrel. This may be useful for comparing properties at different positions, e.g. at the tip of the teat compared with elsewhere.

In another example, the auxiliary module may include a camera configured to capture an image of the internal volume.

In a further example, the auxiliary module may be configured to selectively permit fluid communication between the internal volume and an environment outside the outer hood. This arrangement may be used instead of or in addition to a vent at the first end of the liner as a means for permitting airflow along the teat when the inner barrel is in a collapsed state.

In a yet further example, the auxiliary module may comprise a fluid delivery mechanism for injecting or otherwise directing a sanitisation fluid (e.g. iodine) onto the teat, e.g. when the milking process is complete.

Any combination of the above examples of functions for the auxiliary module may be provided in the same unit.

The improved access to the internal volume may be an independent aspect of the invention. According to that aspect, there is provided a milking apparatus comprising: a liner made from a resiliently deformable material, the liner extending along a longitudinal direction; and a rigid support shell, wherein the liner is mounted on the rigid support shell, wherein the liner comprises: an outer hood configured to lie over an outer surface of the rigid support shell; an inner barrel configured to be disposed within the rigid support shell and to define an internal volume of the liner, the inner barrel extending in the longitudinal direction away from an opening at a first end of the liner, through which opening an animal teat is insertable into the internal volume, wherein the outer hood has a longitudinal length commensurate with a longitudinal length of the inner barrel, wherein an inner surface of the outer hood is exposed within the internal volume, and wherein the liner further comprises an auxiliary module mounted on the outer hood, wherein the auxiliary module is configured to access the internal volume through the outer hood. The auxiliary module may have any of the features or functions discussed above. For example, the auxiliary module may include a sensor having a longitudinal array of probes configured to detect the property of the internal volume along the length of the inner barrel.

BRIEF DESCRIPTION OF DRAWINGS

Embodiments of the invention are discussed below with reference to the accompanying drawings, in which.

DETAILED DESCRIPTION; FURTHER OPTIONS AND PREFERENCES

Figure 1:
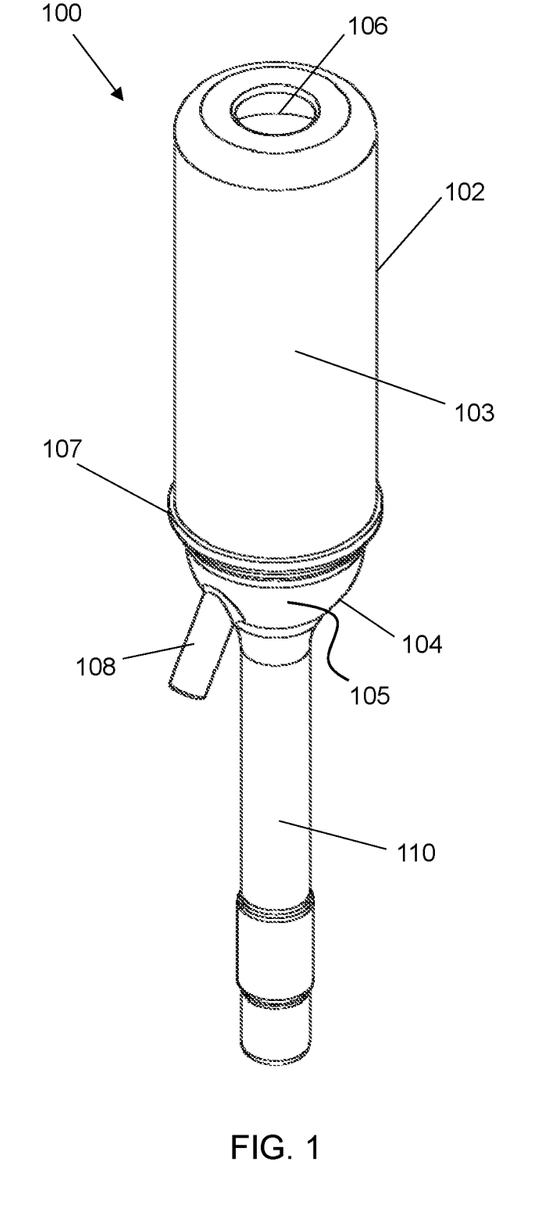
FIG. 1 is a perspective view of a milking apparatus according to an embodiment of the invention.

FIG. 1 is a perspective view of a milking apparatus 100 that is an embodiment of the invention. The milking apparatus 100 may also be referred to as a teat cup assembly. The apparatus comprises a liner 102 that is mounted on a support shell 104.

The liner 102 is made from a resiliently deformable material, such as silicone rubber, and is preferably moulded in one piece. The liner 102 comprises an outer hood 103 in the form of a cylindrical web that extends away from an opening 106 at one end of the liner. The opening 106 is for receiving an animal teat into an internal volume of the liner. The internal volume is defined by a resiliently deformable barrel 116 (not visible in FIG. 1) that is disposed within the space defined by the outer hood 103. A bottom part of the barrel 116 is shown protruding from beneath the hood 103 in FIG. 2.

The barrel 116 is attached to the inner surface of the outer hood 103 along one or more longitudinally extending attachment lines, as discussed in more detail below. The portions of the barrel 116 that extend between adjacent attachment lines each form a resiliently deformable membrane that is configured to be cyclically collapsible on to a teat inserted into the internal volume when the apparatus is in use.

In the example shown in FIG. 1, the liner 102 includes a milking tube section 110 connected to (or formed integrally with) the end of the barrel 116 opposite the opening 116. The milking tube section 110 is adapted to be connected to a suction device for applying a negative pressure (e.g. vacuum or partial vacuum) to draw milk from the teat inserted in the internal volume.

The support shell 104 is made from a rigid material, and is adapted to provide physical support to the liner when in use. For example, the support shell 104 may be formed from a thermoplastic, stainless steel, or the like.

Figure 2:
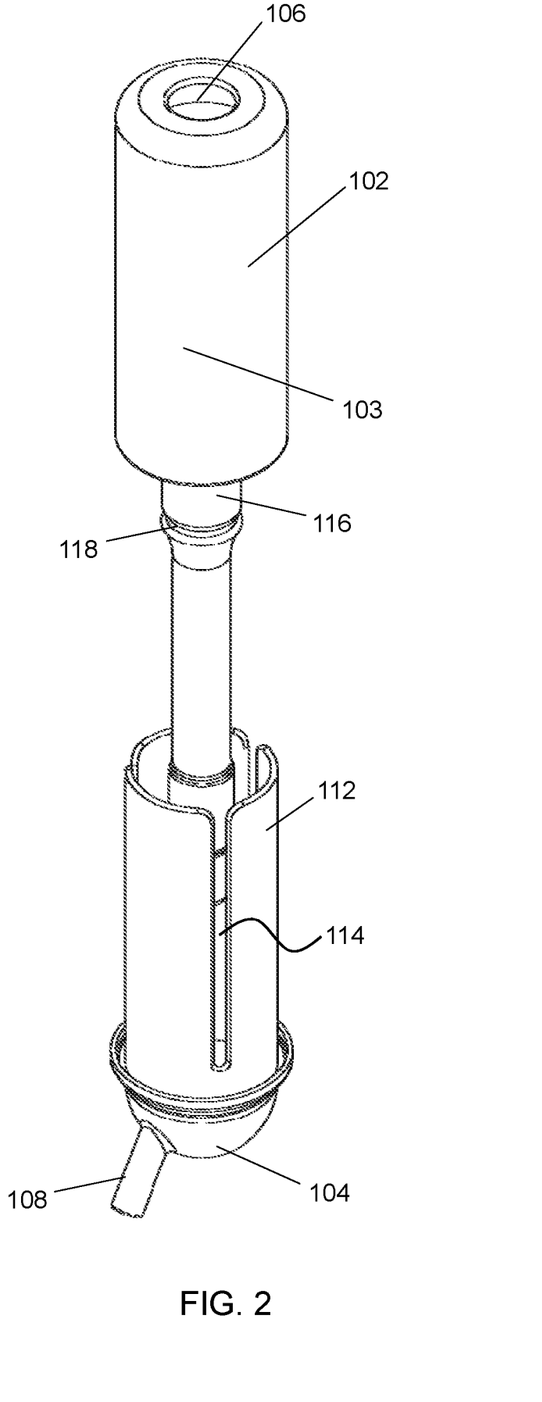
FIG. 2 is an exploded view of the milking apparatus of FIG. 1.

FIG. 2 shows an exploded view of the liner 102 and support shell 104 that shows features of the support shell 104 in more detail. The support shell 104 include a base 105, which, in this embodiment, has a hemispherical shape. The base 105 is attachable to a bottom edge of the outer hood 103, e.g. at a lip 107 formed around its upper periphery.

The support shell 104 include a plurality of upstanding support fins 112 that extend from within the base 105. Adjacent support fins 112 are separated by longitudinal slots 114 which are position to correspond to the attachment lines between the barrel 116 and the outer hood 103 in the liner 102.

Each support fin 112 is a rigid element configured to sit between an inner surface of the outer hood 102 and an outer surface of the barrel 116. When the support shell 104 is mounted in the liner 102, a space is formed between the support fins 112 and the outer surface of the barrel 116. A control tube 108 mounted on the base 105 provides fluid communication between this space (which may be referred to as a pulsation chamber) and a pressure generating device (not shown). The pressure generating device is controllable to switch or otherwise vary the pressure in the pulsation chamber to alter the pressure drop across the barrel (i.e. between the internal volume and the pulsation chamber). In one example the pulsation chamber is switched between atmospheric pressure and a vacuum. When the pulsation chamber is at atmospheric pressure, the membranes of the barrel will collapse on to the teat.

The support fins 112 may be integrally formed with the base 105. However, in other examples, the fins may be detachable. The support shell 104 may therefore have a modular form, whereby fins with differing shapes or physical properties can be mounted in the base depending on the type of liner or desired performance.

In use the barrel 116 may be place under longitudinal tension. This may be done through the connection between the liner 102 and support shell 104. For example, the liner 102 may include a circumferential notch 118 below the barrel 116. The notch 118 may be configured to engage with a corresponding lip (not shown) formed around an aperture in the base 105 of the support shell through which the milking tube section 110 extends. The dimensions of the liner 102 and support shell 104 may be selected to require the barrel 116 to be stretched longitudinally in order for the lip to be seated in the notch 118. The engagement between the lip and notch retains the barrel in this stretched configuration.

Figure 3:
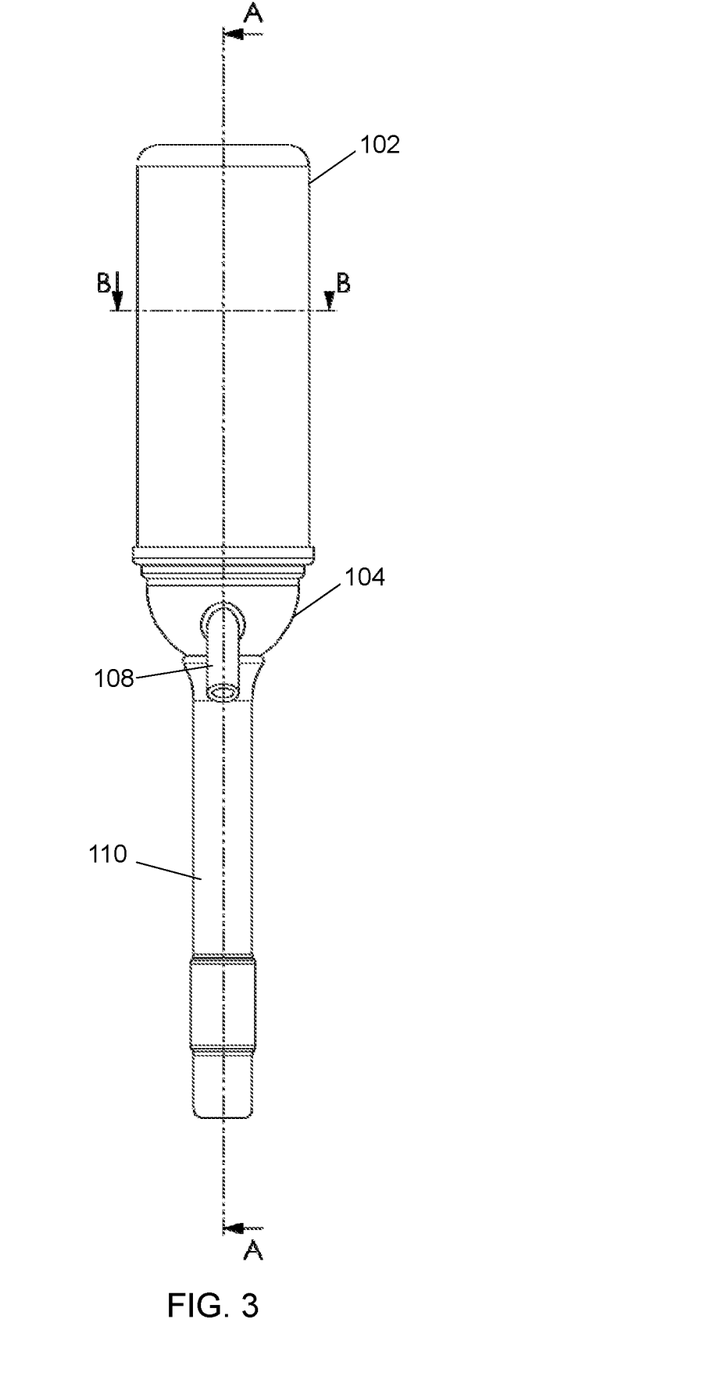
FIG. 3 is a side view of the milking apparatus of FIG. 1.
Figure 4:
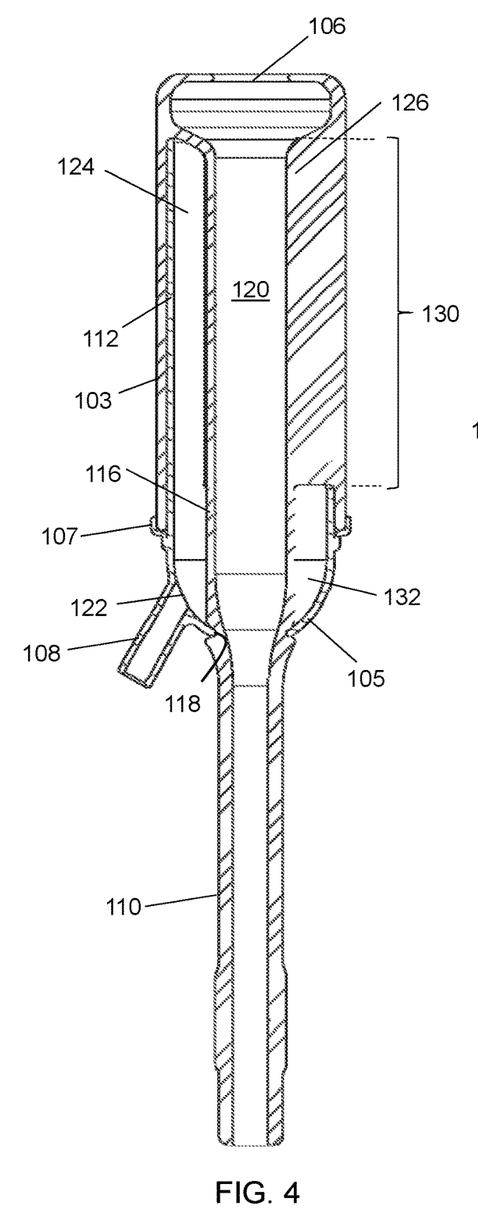
FIG. 4 is a longitudinal cross-sectional view of the milking apparatus of FIG. 1.
Figure 5:
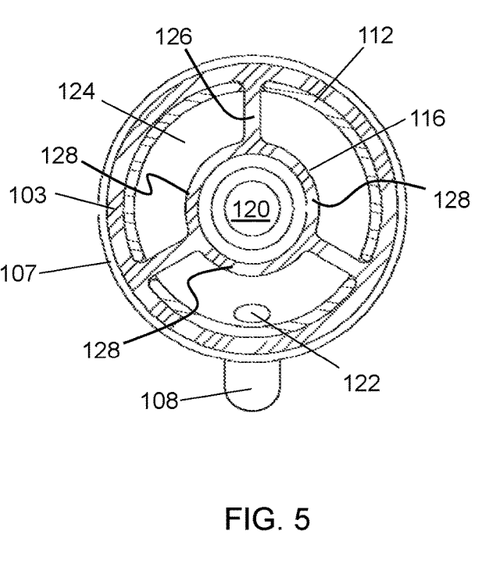
FIG. 5 is a transverse cross-sectional view of the milking apparatus of FIG. 1.

FIG. 3 is a side view of the milking apparatus 100 shown in FIG. 1. FIG. 4 is a longitudinal cross-sectional view taken along the line A-A in FIG. 3. FIG. 5 is a transverse cross-sectional view taken along the line B-B in FIG. 3. The cross-sectional views show features of the barrel 116 in more detail.

FIG. 4 shows a bottom periphery edge of the outer hood 103 seated in a recess formed by the lip 107 formed around the top edge of base 105. The notch 118 at the bottom of barrel 116 has a bottom rim of the base 105 seated therein.

As best shown in FIG. 5, the barrel in this example comprises a tubular (e.g. cylindrical) body that surrounding the internal volume 120. In this example, the barrel comprises a three resiliently deformable membranes 128 that extend adjacent pairs of radially extending ribs 126. There are three ribs 126, disposed equally around the circumference of the barrel 116. The invention permits a wide variety of configurations for the membranes 128 and ribs 126, as discussed below.

Each rib 126 extends radially from the barrel 116 (i.e. the plurality of membranes 128) to the outer hood 103. Each rib 126 extends substantially along the whole length of the outer hood 103 as shown in FIG. 4. The barrel 116 thus has a direct (i.e. integral) physical connection with the outer hood 103 along a length 130 that defines the internal volume 120 for receiving a teat.

The outer hood 103 is held away from the membranes 128 by the support fins 112. This creates a space 124 between an outer surface of each membrane 128 and an inner surface of each support fin 112. In this example there are three spaces 124. At the ribs 126 terminate before the bottom of the barrel 116, the spaces 124 are in fluid communication with each other via a space 132 within base 105.

The outer hood 103 may be stretched around the support fins 112, whereby the ribs 126 are placed under radial tension. This radial tension can be transferred through the ribs to the membranes so that they are under transverse tension when there is no pressure difference across the barrel. However, providing transverse tension need not be essential. Even without being stretched, the ribs 126 in conjunction with the support fins 112 define boundary conditions that limit the shape or extent of deformation of the membranes in use.

As discussed above, in use, the internal volume 120 is held at low pressure, e.g. vacuum or partial vacuum. A pressure generating device (not shown) is attached to the control tube 108. The control tube 108 is in communication with the space 132 within the base 105 through aperture 122. The pressure generating device may thus operate to vary the pressure in the spaces 124, in order to control the behaviour of the membrane 128. Thus, when atmospheric pressure is applied in the spaces 124, the membranes 128 will collapse on to the teat. When a vacuum in applied to the spaces 124, the barrel 116 will reform, and the membranes 128 will draw away from the teat.

The manner in which the membranes 128 collapse on to the teat is affected by the ribs 126. As well as providing a mechanism by which transverse tension may be applied, the ribs 126 act as boundary conditions that constrain the deformation of the membranes 128. By providing the membranes 128, ribs 126 and outer hood 103 as a single moulded article, control over the manner of barrel deformation can be improved compared with milking apparatuses in which the barrel is tensioned by other means.

As mentioned above, the invention allows for variation in the configuration of the membranes and ribs. Examples are shown in FIGS. 6-8.

Figure 6A:
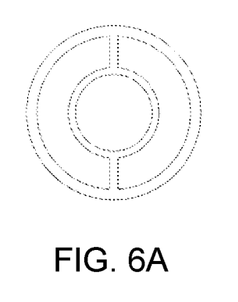
FIGS. 6A, 6B and 6C are transverse cross-sectional views of liners having differing rib configurations that can be used with the milking apparatus of FIG. 1.
Figure 6B:
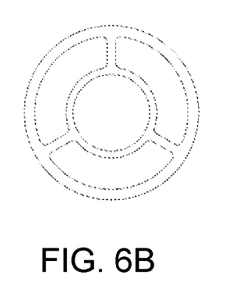
Figure 6C:
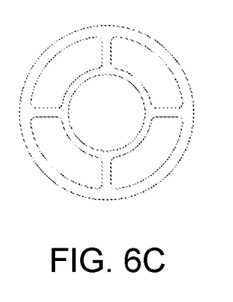

FIGS. 6A, 6B and 6C show examples of liners with differing numbers of ribs. Each of FIGS. 6A, 6B and 6C is a transverse cross-sectional view of a liner, similar to that shown in FIG. 5, but with the support shell omitted.

FIG. 6A shows an example with two diametrically opposed ribs. FIG. 6B shows an example with three ribs that are equally spaced around the circumference of the barrel, similar to the example of FIG. 5. FIG. 6C shows an example with four ribs that are equally spaced around the circumference of the barrel.

Figure 7A:
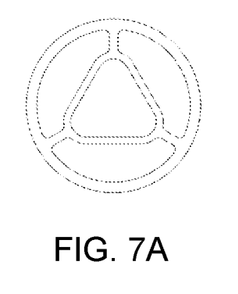
FIGS. 7A, 7B and 7C are transverse cross-sectional views of liners having differing barrel geometries that can be used with the milking apparatus of FIG. 1.
Figure 7B:
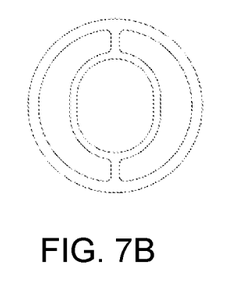
Figure 7C:
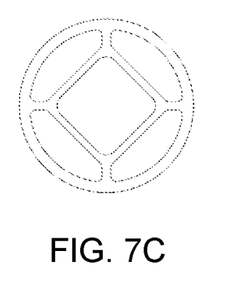
Figure 8A:
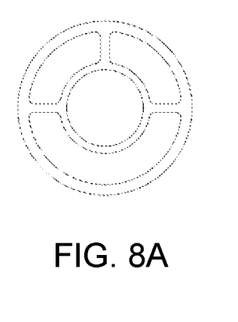
FIGS. 8A, 8B and 8C are transverse cross-sectional views of liners having asymmetric deformation characteristics that can be used with the milking apparatus of FIG. 1.
Figure 8B:
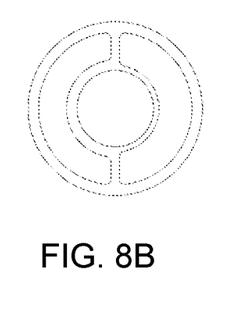
Figure 8C:
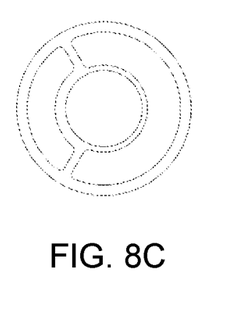

FIGS. 7A, 7B and 7C shows examples of liners with differing barrel geometries. In the example shown in FIG. 5, the barrel has a circular cross-section, i.e. it defines a cylindrical internal volume 120. Each of FIGS. 7A, 7B and 7C show a transverse cross-sectional view of a liners with a non-circular cross-section.

FIG. 7A shows an example with a triangular barrel cross-section support by three ribs. The ribs are disposed at the apexes of the triangle. FIG. 7B shows an example with a oval barrel cross-section supported by two ribs. The ribs are disposed at opposite sides of the barrel along the major axis of the oval. FIG. 7C shows an example with a square (or diamond) barrel cross-section supported by four ribs. The ribs are disposed at the corners of the square.

FIGS. 8A, 8B and 8C show examples of liners in which the barrel is configured to exhibit an asymmetric deformation characteristic. Each of FIGS. 8A, 8B and 8C are transverse cross-sectional similar to that shown in FIG. 5.

FIG. 8A shows an example in which the ribs are not disposed symmetrically around the barrel. In FIG. 8A there are three ribs around a barrel with a circular cross-section. The ribs are spaced by 90° from each other around the barrel, so that one side of the barrel does not have any rib. The side without the rib will tend to deform more than the side with the ribs.

FIG. 8B shows an example in which the barrel wall varies in thickness. In this example there are two diametrically opposed ribs supporting a barrel with a circular cross-section. The barrel wall comprises a first membrane extending between the ribs on a first side of the liner, and a second membrane extending between the ribs on a second side of the liner. The first membrane is thicker than the second membrane. The second membrane will thus tend to deform more than the first membrane.

FIG. 8C shows an example similar to FIG. 8B, but where the two ribs are separated by 120° rather than 180°. The thicker first membrane therefore extends around a smaller portion of the circumference of the barrel than the second membrane.

An advantage of an asymmetric deformation characteristic is that it allows for the provision of a venting channel that allowed air flow along the teat when the inner barrel is in a collapsed state. Conventionally, such venting channels are formed by selecting a triangular cross-sectional shape for the barrel. However, in the present invention, the connection regions between the inner barrel and the outer hood enable the boundary conditions to be set such that any cross-sectional shape of inner barrel can be configured to deform in a preferential manner to leave open a venting channel. This may be particular useful with a circular cross-sectional shape, which cannot normally be used to provide a venting channel because it seals against the whole circumference of the teat.

In may be understood that the barrel configurations discussed above are examples only, and other configurations may be readily obtained by combining the concepts outlined above. Examples of such configurations are shown in FIGS. 9A-9C, 10A-10D and 11A-11C.

Figure 9A:
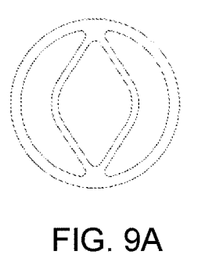
FIGS. 9A, 9B and 9C are transverse cross-sectional views of liners where the barrel adjoins the outer hood that can be used with the milking apparatus of FIG. 1.
Figure 9B:
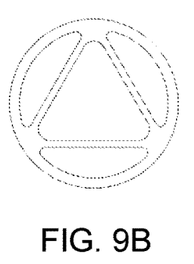
Figure 9C:
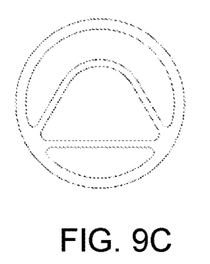
Figure 10A:
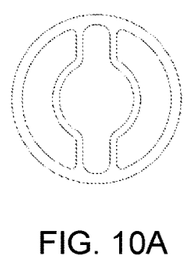
FIGS. 10A, 10B, 10C and 10D are transverse cross-sectional views of liners wherein the outer hood defined part of the internal volume that can be used with the milking apparatus of FIG. 1.
Figure 10B:
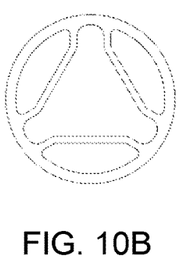
Figure 10C:
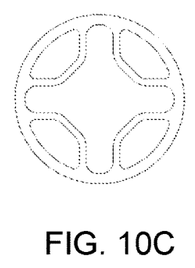
Figure 10D:
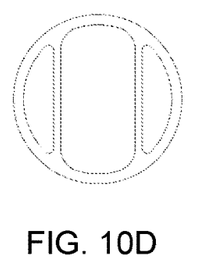

In FIGS. 9A, 9B and 9C, the barrel is formed from two or more membranes. Instead of extending between ribs that protrude from an inner surface of the outer hood, the membranes in this example meet each other at a junction that is on the outer hood itself. The cross-sectional shape of the barrel may take any suitable form. For example it may be a symmetrical oval, e.g. as shown in FIG. 9A, a triangle, e.g. as in FIG. 9B, or an asymmetric shape as shown in FIG. 9C.

In FIGS. 10A, 10B, 10C and 10D, the inner surface of the outer hood may itself form part of the barrel. In these examples, the membranes that constitute part of the barrel are not joined to each other. Instead, they are joined to the inner surface of the outer hood at independent (e.g. separate) locations. An advantage of such arrangements is that they facilitate access, e.g. for sensors or the like, to the internal volume defined by of the barrel, without interfering with the operation of the membranes or the rigid support shell.

Figure 11A:
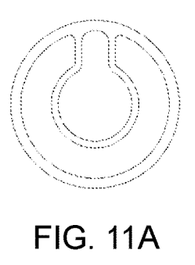
FIGS. 11A, 11B and 11C are transverse cross-sectional views of liners having a combination of features mentioned herein that can be used with the milking apparatus of FIG. 1.
Figure 11B:
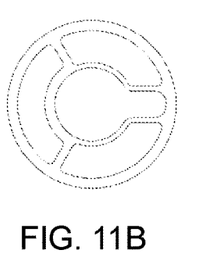
Figure 11C:
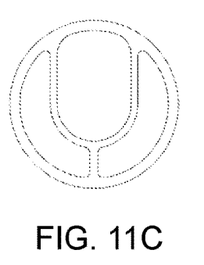

FIGS. 11A, 11B and 11C show different combinations of the ideas mentioned above.

In FIG. 11A the barrel is defined by a single membrane that loops between two circumferentially spaced attachment points on the inner surface of the outer hood. A portion of the inner surface of the outer hood between the attachment point also defines the barrel.

FIG. 11B is similar to FIG. 11A, but further includes a pair of radially extending ribs that connect the membrane to the outer hood at locations spaced about 120° from the attachment points. The membrane is also thicker in the region between the ribs compared with the regions between each rib and a respective attachment point.

In FIG. 11C the barrel is defined by a U-shaped membrane that loops between two circumferentially spaced attachment points on the inner surface of the outer hood. The base of the U-shaped member is connected to the inner surface of the outer hood by a single radial rib.

Figure 12A:
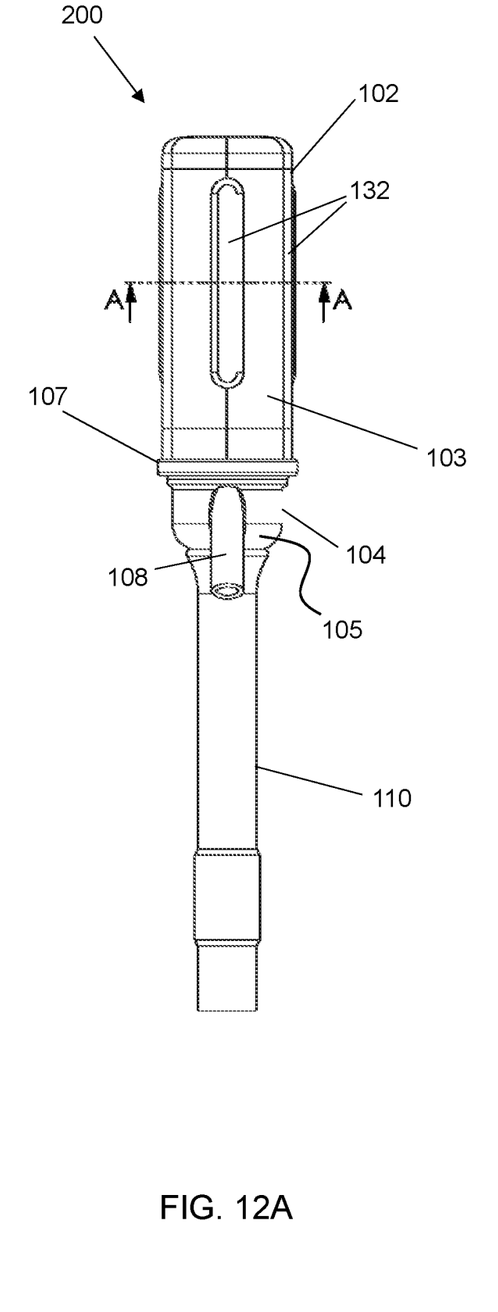
FIGS. 12A and 12B are front and side views respectively of a milking apparatus that is another embodiment of the invention.
Figure 12B:
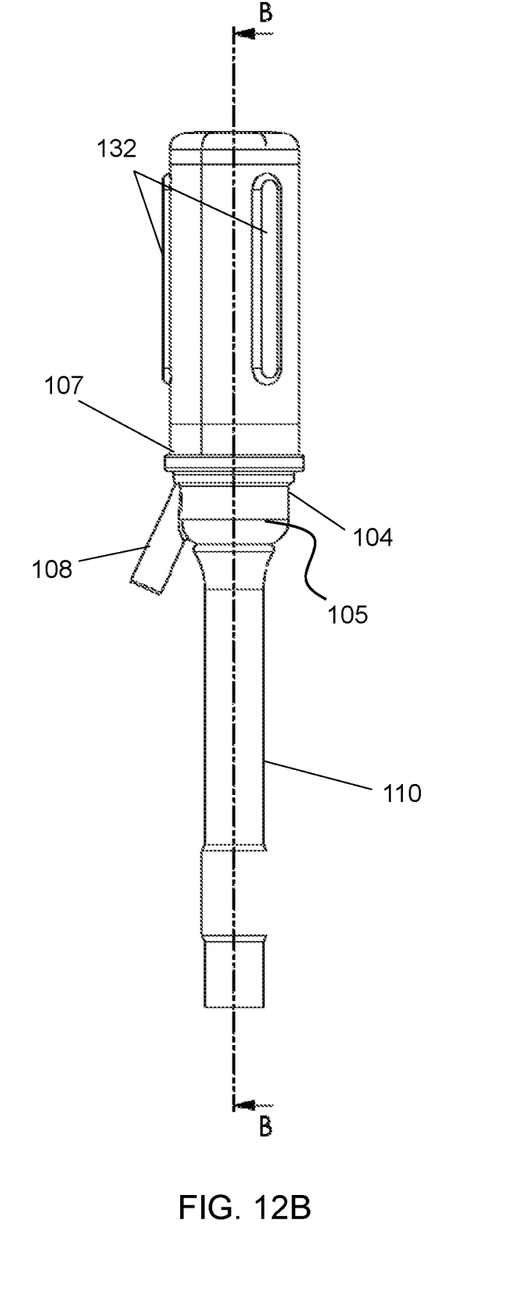

FIG. 12A is a front view of a milking apparatus 200 that is another embodiment of the invention. FIG. 12B is a side view of the milking apparatus 200. Feature in common with the embodiment discussed above with reference to FIGS. 1 to 4 are given the same reference numbers and are not discussed again.

The embodiments in FIGS. 12A and 12B differs from FIG. 1 in the configuration of the barrel (see FIG. 13) and in the provision of a plurality of auxiliary modules 132 on the outer hood 103. In this example there are three auxiliary modules 132 that are equally spaced from each other around the circumference of the outer hood 103. However, any number (e.g. one or more) auxiliary modules 132 may be provided.

Figure 13:
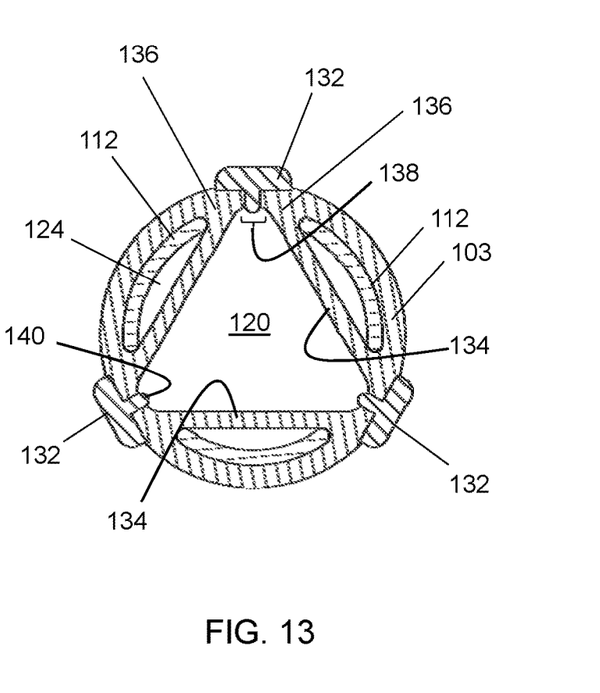
FIG. 13 is a transverse cross-sectional view of the milking apparatus of FIG. 12A.

FIG. 13 is a transverse cross-section through the liner 102, taken through the line A-A in FIG. 12A. In this example, the internal volume 120 is defined by three membranes 134, and has a triangular cross-sectional shape. When viewed in cross-section, each membrane 134 extends as a chord of the circle defined by the outer hood 103. The space 124 between an outer surface of each membrane 134 and an inner surface of the outer hood 103 receive a rigid support fin 112, and forms part of the pulsation chamber as discussed above.

Figure 14:
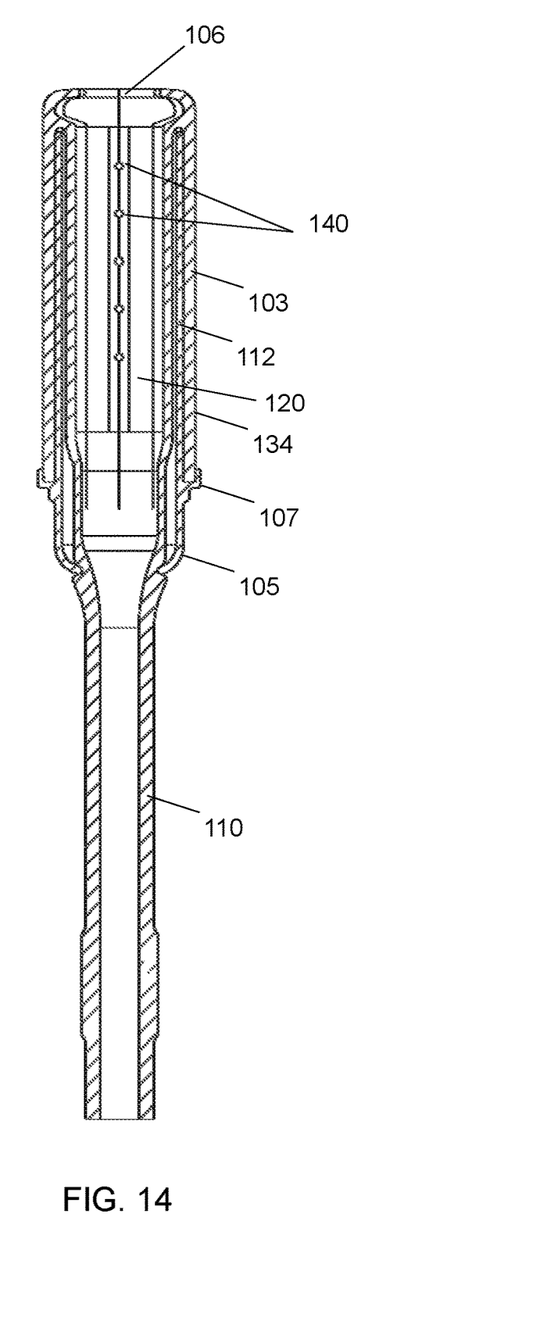
FIG. 14 is a longitudinal cross-sectional view of the milking apparatus of FIG. 12B.

The membranes 134 are integrally formed with the outer hood 103. Each membrane 134 adjoins the outer hood at a pair of attachment points 136. The attachment points 136 for each membrane 134 are independent of each other, such that a portion 138 of the inner surface of the outer hood 103 lies on the boundary that defines the internal volume 120. As shown in FIGS. 13 and 14, each auxiliary module 132 includes a plurality of sensor probes 140 that penetrate the inner surface of the outer hood 103 to be exposed in the internal volume 120.

FIG. 14 is a longitudinal cross-sectional view of the liner 102, taken along the line B-B in FIG. 12B. In this view, it can be seen that each auxiliary module 132 comprises an array of probes 140 that are exposed in the internal volume 120.

An advantage of the embodiment shown in FIGS. 12-14 is that it enables sensing of the environment within the internal volume 120 (where the teat is received) without affecting the cyclic operation of the membranes 134, and without requiring the rigid support shell to be adapted. In conventional liners, the barrel is typically completely surround by a rigid shell, which forms a separate part from the barrel. Such arrangements make access to the internal volume difficult or impossible. It is particularly useful to provide access to a sensor along the whole longitudinal extent of the barrel.

The auxiliary module 132 may comprise a sensor having any suitable sensing modality for detecting properties of the environment within the internal volume. For example, the auxiliary module 132 may include any one or more of: an imaging device, an optical sensor, a temperature sensor, and a pressure sensor. The auxiliary module 132 may be utilised to detect a teat length, or to sense a pressure level, e.g. at the end of the teat.

The auxiliary module 132 may include a communications module to allow it to send and/or receive data, e.g. sensed information, to a remote computing device. Any suitable wired or wireless mode of communication may be used. The remote computing device may be a mobile device, e.g. a smartphone or the like, or may be a control computer for the milking apparatus.

The auxiliary module 132 may be used for other purposes, in addition to or as an alternative to sensing. For example, the auxiliary module 132 may comprise a pressure control device, e.g. for controlling fluid communication between the internal volume and an environment outside the outer hood.

The pressure control device may operate independently of a vacuum source connected to the internal volume, e.g. by the milking tube 110. The pressure control device may operate to permit air to be selectively introduced along the length of a teat. Such an arrangement can permit air for venting the internal volume to be introduced in a different manner to conventional arrangements. In particular, instead of venting from a head portion of the liner, a venting channel can run from the auxiliary module 132 mounted on the side surface of the outer hood.

The invention claimed is:

1. A milking apparatus comprising:
   a liner made from a resiliently deformable material, the liner extending along a longitudinal direction; and
   a rigid support shell, wherein the liner is mounted on the rigid support shell,
   wherein the liner comprises:
      an outer hood configured to lie over an outer surface of the rigid support shell;
      an inner barrel configured to be disposed within the rigid support shell and to define an internal volume of the liner, the inner barrel extending in the longitudinal direction away from an opening at a first end of the liner, through which opening an animal teat is insertable into the internal volume,
   wherein the outer hood has a longitudinal length commensurate with a longitudinal length of the inner barrel, and
   wherein the inner barrel is connected to the outer hood at a plurality of longitudinally extending connection regions on an inner surface of the outer hood.

2. The milking apparatus of claim 1, wherein the inner barrel comprises a plurality of resiliently deformable membranes.

3. The milking apparatus of claim 2, wherein each of the plurality of membranes span between a respective pair of the longitudinally extending connection regions on the inner surface of the outer hood.

4. The milking apparatus of claim 2, wherein each longitudinally extending connection region comprises a longitudinal rib that protrudes laterally inwards from the inner surface of the outer hood, and wherein each of the plurality of membranes extends between a pair of the ribs.

5. The milking apparatus of claim 2, wherein the rigid support shell comprises a plurality of fins, wherein each fin is disposed in a space between an outer surface of a respective membrane and the inner surface of the outer hood, and wherein the plurality of longitudinally extending connection regions extend along a gap between adjacent fins.

6. The milking apparatus of claim 5, wherein the rigid support shell comprises a base in which the plurality of fins are retained.

7. The milking apparatus of claim 6, wherein the plurality of fins are detachably mounted in the base.

8. The milking apparatus of claim 5, wherein the rigid support shell includes a control tube in fluid communication with each space between the outer surface of the membrane and the inner surface of the outer hood.

9. The milking apparatus of claim 1, wherein the outer hood is stretched over the rigid support shell to impart transverse tension to the inner barrel.

10. The milking apparatus of claim 1, wherein the outer hood is cylindrical.

11. The milking apparatus of claim 1, wherein the inner barrel has a non-circular transverse cross-section.

12. The milking apparatus of claim 1, wherein the liner comprises a vent at the first end thereof, where the vent is configured for the limited admission of ambient air into the internal volume.

13. The milking apparatus of claim 12, wherein the inner barrel is configured to deform in a manner where, in a collapsed state, it defines one or more venting channels that permit airflow along the length of the inner barrel adjacent the teat from the vent to a second end of the inner barrel opposite the opening.

14. The milking apparatus of claim 1, wherein the milking apparatus further comprises a suction source connected to apply a suction force to the internal volume from a second end of the inner barrel opposite the opening.

* * * * *